(12) United States Patent
Guillou

(10) Patent No.: US 7,415,614 B2
(45) Date of Patent: Aug. 19, 2008

(54) CRYPTOGRAPHIC AUTHENTICATION WITH EPHEMERAL MODULES

(75) Inventor: Louis Guillou, Paris (FR)

(73) Assignees: France Telecom, Paris (FR); Telediffusion de France, Paris (FR)

( * ) Notice: Subject to any disclaimer, the term of this patent is extended or adjusted under 35 U.S.C. 154(b) by 649 days.

(21) Appl. No.: 10/471,884

(22) PCT Filed: Mar. 12, 2002

(86) PCT No.: PCT/FR02/00884

§ 371 (c)(1),
(2), (4) Date: Mar. 8, 2004

(87) PCT Pub. No.: WO02/073876

PCT Pub. Date: Sep. 19, 2002

(65) Prior Publication Data

US 2004/0133781 A1 Jul. 8, 2004

(30) Foreign Application Priority Data

Mar. 12, 2001 (FR) .................................. 01 03313

(51) Int. Cl.
*H04L 9/00* (2006.01)

(52) U.S. Cl. ........................ 713/176; 713/156; 713/170; 713/171; 380/277; 380/278; 380/279; 380/282; 380/285

(58) Field of Classification Search .................. 380/277, 380/278, 279, 282, 285; 713/156, 170, 171, 713/176, 182, 183, 184
See application file for complete search history.

(56) References Cited

U.S. PATENT DOCUMENTS

| 4,932,056 | A | * | 6/1990 | Shamir | 713/180 |
| 5,502,764 | A | * | 3/1996 | Naccache | 713/180 |
| 5,581,615 | A | * | 12/1996 | Stern | 713/180 |
| 6,081,893 | A | * | 6/2000 | Grawrock et al. | 713/183 |
| 6,393,563 | B1 | | 5/2002 | Maruyama et al. | 713/155 |
| 6,490,682 | B2 | * | 12/2002 | Vanstone et al. | 713/171 |
| 6,516,414 | B1 | * | 2/2003 | Zhang et al. | 713/176 |
| 7,266,197 | B1 | * | 9/2007 | Guillou et al. | 380/44 |

FOREIGN PATENT DOCUMENTS

FR 2 788 912 7/2000

OTHER PUBLICATIONS

Shaohu A Tang, Directed user authentication scheme based on discrete logarithm, 1999, Journal of Circuits, Systems, and Computers, vol. 9, Nos. 5 & 6, pp. 299-306.*

(Continued)

*Primary Examiner*—Nasser Moazzami
*Assistant Examiner*—Fatoumata Traore
(74) *Attorney, Agent, or Firm*—Westman, Champlin & Kelly, P.A.

(57) ABSTRACT

A method for enabling a personal computer to be authenticated by a server is provided. The method comprises the step, which includes for the user in launching the execution of a log-on procedure software, introducing personal identifiers providing access to a signature private key for long-term use relative to the duration of the session. The log-on procedure software produces: identification data of the session Id, a public ephemeral module, a public exponent and at least a pair of ephemeral pubic numbers and ephemeral private numbers related by a generic equation of the type: $G_i \equiv Q_i^v \pmod{n}$ or $G_i \cdot Q_i^v \equiv 1 \pmod{n}$, an ephemeral certificate linking, by means of said signature private key, Id and public ephemeral module. The public ephemeral module is of reduced size relative to the signature private key.

12 Claims, 1 Drawing Sheet

OTHER PUBLICATIONS

R. A. Nelson, Authentication techniques for smart cards, Hanford Operations and Engineering Contractor for the U.S. Department of energy under contract DE-AC06-87RL10930, Presented at the cardTech SecurTech 94, WHC-SA-2307-FP.*

Jan et al, "Paramita wisdom" password authentication scheme without verification tables, The journal of systems and software 42, 1999 pp. 45-57.*

Guillou et al, A"Paradoxical" Indentity-based signature scheme resulting from zero-knowledge, SGoldwasser advance in cryptology crypto 88, LNCS 403, pp. 216-231, 1990.*

Menezes et al (Handbook of Applied Cryptography, ISBN 0-8493-8523-7 1997.*

"An Implementation of a Zero-Knowledge Protocol for a Secure Networklogin Procedure", Energy and Information Technologies in the Southeast, Columbia, Apr. 9-12, 1989, pp. 197-201.

* cited by examiner

US 7,415,614 B2

CRYPTOGRAPHIC AUTHENTICATION WITH EPHEMERAL MODULES

CROSS-REFERENCE TO RELATED APPLICATION

This Application is a 35 USC 371 National Stage Application of International Application No. PCT/FR02/00884, filed Mar. 12, 2002 and published as WO 02/073876 on Sep. 19, 2002 not in English.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

(a) Field of the Invention

The present intention relates to the technical field of methods and systems by which a first computer device, such as a personal computer, can be authenticated by at least one second computer device such as a server.

SUMMARY OF THE INVENTION

The invention relates to a method by which a first computer device, such as a personal computer, can be authenticated by at least one second computer device such as a server. Said computer devices are connected to a communications network.

The method according to the invention comprises two phases: a phase in which a specified user logs on to initiate a session on said first computer device and a phase during the session as such.

I. During the Phase of the Logging on to Said First Computer Device by a Specified User During the log-on phase, the method of the invention comprises a step, for a specified user, which consists in logging on for a session of limited duration, for example a few hours, on said first computer device, by launching the execution of a log-on software and by introducing personal identifiers, in particular a password and/or a fingerprint. Said personal identifiers make it possible to check the identity of said specified user and access a private signature key of said specified user.

Said log-on software produces session identifier data Id, especially from data for identifying the specified user and/or data for identifying said first computer device and/or from the date and/or the time and/or said duration of the session.

Said log-on software also produces a public ephemeral module n, a public exponent v and at least one pair of ephemeral public numbers G, and ephemeral private numbers Q related by a generic equation of the type:

$$G \equiv Q^v \pmod{n} \text{ or } G \times Q^v \equiv 1 \pmod{n} \qquad \text{I.}$$

Said log-on software also produces a unique ephemeral certificate, in signing, by means of said private signature key of the specified user, said session identifier data Id and said public ephemeral module n and as the case may be, said public exponent v or said ephemeral public numbers G;

II. During the Session

After the log-on phase and throughout the duration of the session, the execution of the log-on software is disabled.

During the session considered, at least during the first connection of said first computer device to each of said second computer devices, the method of the invention comprises the step, for said specified user, of launching the execution of a proof software program. Said proof software program disseminates said ephemeral certificate, through the communications network, to the second computer device. Said proof software produces proofs that play a part in the implementation of a zero-knowledge authentication mechanism, especially of the GQ type.

Zero-knowledge GQ authentication mechanisms have been described in the patent EP 0 311 470 B1, the PCT application WO 00/46946 published on 10 Aug. 2000, the PCT application WO 00/45550 published on 3 Aug. 2000 and the PCT application WO 00/46947 published on 10 Aug. 2000. These documents are cited by reference.

In the case of the present invention, said proof software acts as a witness, as understood in the GQ authentication protocol.

During the session, the method according to the invention furthermore comprises the step, for said second computer device, of launching the execution of a verification software program opening said ephemeral certificate with a public key associated with said private signature key, and of extracting, from said ephemeral certificate, the session identifier data Id and said public ephemeral modules n and also, as the case may be, said public exponent v or said ephemeral public numbers G.

Said proof software acts as a verifier, as understood in the GQ authentication protocol.

Preferably, in an alternative embodiment, the method according to the invention is such that said private signature key of said specified user is located in a cryptogram contained in said first computer device. In the case of this variant, the method according to the invention furthermore comprises the step, for said log-on software, of deciphering said cryptogram in implementing said personal identifiers of said specified user.

Preferably, in the case of another alternative embodiment, said private signature key of said specified user is located in a cryptogram contained in a memory card held by said specified user. In this case, the method according to the invention furthermore comprises the step, for said specified user, of inserting said memory card in a memory card reader associated with said first computer device. In this case, the method according to the invention furthermore comprises a step, for said log-on software, of deciphering said cryptogram by implementing said personal identifiers of said specified user.

Preferably, in the case of another alternative embodiment, said private signature key of said specified user is confined with signature algorithms in a memory card held by said specified user. In the case of this alternative embodiment, the method according to the invention furthermore comprises the step, for said specified user, of inserting said memory card in a memory card reader associated with said first computer device. In the case of this alternative embodiment, the method according to the invention furthermore comprises the step, for said log-on software, of producing said ephemeral certificate in executing said signature algorithms implementing said private signature key.

First Alternative Embodiment

Case of a GQ0 Type Authentication Protocol

Preferably, according to a first alternative embodiment of the invention, the method is implemented in the case of a GQ0 type authentication protocol. In this case, for the production of said public ephemeral module n, said public exponent v as well as at least one pair of ephemeral public numbers G and ephemeral private numbers Q, the method further comprises the following steps:

the step of setting the value of said public exponent v, the step of randomly choosing said public ephemeral modules n, the step of choosing m ephemeral private numbers $Q_1$ to $Q_m$, the step of computing said ephemeral public numbers G by obtaining either of the generic equations.

The ephemeral certificate relates the public ephemeral module n, the public exponent v and the ephemeral public numbers G to the session identifier data Id.

Preferably again, in the case of this first alternative embodiment, the GQ0 type authentication protocol comprises a proof mechanism implementing said public ephemeral modules n and said m ephemeral private numbers $Q_1$ to $Q_m$.

Second Alternative Embodiment

Case of a GQ1 Type Authentication Protocol

Preferably, according to a second alternative embodiment of the invention, the method is implemented in the case of a GQ1 type authentication protocol. In this case, for the production of said public ephemeral module n and said public exponent v as well as at least one pair of ephemeral public numbers G and ephemeral private numbers Q, the method further comprises the following steps:

the step of setting the value of said public exponent v, the step of producing said ephemeral module n by multiplying at least two ephemeral prime factors such that v is prime with each ephemeral prime factor minus one, the step of producing the ephemeral public numbers G by the application, to a message $m_i$, of an RSA signature standard format mechanism, $G=Red(m_i)$, the step of determining a private exponent s such that $s \cdot v - 1$ is a multiple of each ephemeral prime factor minus one, the step of producing the ephemeral private numbers $Q_i$, especially by raising the ephemeral public numbers G to the power of the private exponent s modulo n, and/or producing m×f ephemeral private components $Q_{i,j}$ of the m ephemeral private numbers $Q_i$.

The ephemeral certificate relates the public ephemeral module n and the public exponent v, to the session identifier data Id. Indeed, in the case of this alternative embodiment, the messages $m_i$ do not need any special protection.

Preferably, in the case of this second embodiment, the GQ1 type authentication protocol comprises a proof mechanism implementing:

either said public ephemeral module n and said m ephemeral private numbers $Q_1$ to $Q_m$, or the f ephemeral prime factors $p_i$ to $p_f$ of the ephemeral module $n = p_1 \times \ldots \times p_f$, the m×f ephemeral private components $Q_{1,1}$ to $Q_{f,m}$ and the f−1 parameters of the ephemeral Chinese remainders.

Third Alternative Embodiment

Case of a GQ2 Type Authentication Protocol

Preferably, according to a third alternative embodiment of the invention, the method is implemented in the case of a GQ2 type authentication protocol. In this case, for the production of said public ephemeral module n, said public exponent v as well as m pairs of ephemeral public numbers G and ephemeral private numbers Q, m being greater than or equal to 1, the method further comprises the following steps:

the step of setting the value of a parameter k enabling the computation of said public exponent v of the $v=2^k$ type the step of producing a public ephemeral module n that is a product of f ephemeral prime factors $n = p_1 \times p_2 \times \ldots \times p_f$, f being greater than or equal to 2, the step of choosing m ephemeral base numbers $g_i$, preferably small, especially smaller than 100, enabling the definition of the m ephemeral public numbers $G_i$ of the $G^i = g_i^2$ type, the step of producing the m ephemeral private numbers $Q_i$, especially in raising the ephemeral public numbers G to the power of the private exponent s modulo n, and/or producing m×f ephemeral private components $Q_{i,j}$ of the m ephemeral private numbers $Q_i$.

The ephemeral certificate relates the public ephemeral module n to the session identifier data Id. Indeed, the number k and the m base numbers $g_i$ do not need any special protection.

Preferably again, in the case of this third alternative embodiment, the GQ2 type authentication protocol comprises a proof mechanism implementing:

either said public ephemeral module n and said m ephemeral private numbers $Q_1$ to $Q_m$, or the f ephemeral prime factors $p_1$ to $p_f$ of the ephemeral module $n = p_1 \times \ldots \times p_f$, the m×f ephemeral private components $Q_{1,1}$ to $Q_{f,m}$ and the f−1 parameters of the ephemeral Chinese remainders.

The implementation of small-sized ephemeral public numbers G and ephemeral private numbers in GQ type authentication protocols, using the Chinese remainders method associated with RSA type log-on protocols, makes it possible to:

reduce the workloads and, correlatively, the waiting time of the users during each phase of authentication of their personal computer by the servers that they wish to access, in a ratio of one to hundred as compared with what they would have been if the method had implemented RSA type protocols, achieve this result without the security of the authentication method being lowered by the implementation of small-sized ephemeral public numbers G and ephemeral private numbers during sessions of short duration.

Indeed, firstly, for comparable computation capacities of circumvention, the GQ protocols provide security higher than that of the RSA protocols, secondly, the RSA-type, long-duration, large-sized private signature key used to generate the ephemeral certificates is not accessible during the sessions, finally, the ephemeral character of the small-sized public numbers G and private numbers does not give fraudulent persons the time needed to retrieve the confidential data from the GQ authentication protocols.

The method according to the invention can be used to identify a user using a specified personal computer during a session and authenticate this personal computer from several servers. It is not necessary for the user to memorize several passwords. Nor is it necessary for the users and the managers of servers to have large computation resources in their personal computers or servers.

System

The invention also relates to a system by which a first computer device, such as a personal computer, can be authenticated by at least one second computer device such as a server. Said computer devices are connected to a communications network. The system according to the invention comprises elements to carry out two phases: a phase in which a specified user logs on to said first computer device for a session and a phase during the session as such.

I. During the Phase of the Logging on to Said First Computer Device by a Specified User To carry out the log-on phase, said first computer device comprises a log-on software program installed on said first computer device. The execution of the log-on software program is launched by the specified user, when logging on to said first computer device for a session of limited duration, by the activation of a control unit, especially a keyboard of said first computer device, and by the introduction, through said control unit, of personal identifiers, in particular a password and/or a fingerprint. Said personal identifiers make it possible to check the identity of said specified user and access a private signature key of said specified user. Said first computer device furthermore comprises first computation means, controlled by said log-on software, to produce session identifier data Id, especially from data for identifying the specified user and/or data for identifying said first computer device and/or from the date and/or the time and/or said duration of the session. The first computation means, controlled by said log-on software, furthermore produce a public ephemeral module n, a public exponent v and at least one pair of ephemeral public numbers G, and ephemeral private numbers Q related by a generic equation of the type:

$$G \equiv Q^v \pmod{n} \text{ or } G \times Q^v \equiv 1 \pmod{n}$$

The first computation means, controlled by said log-on software, furthermore produce a unique ephemeral certificate in signing, by means of said private signature key of the specified user, said session identifier data Id and said public ephemeral module n and as the case may be, said public exponent v or said ephemeral public numbers G;

II. During the Session

Said first computer device furthermore comprises disabling means to disable the execution of the log-on software, after the log-on phase, throughout the duration of the session.

Said first computer device furthermore comprises a proof software program installed on said first computer device. The execution of the proof software is launched by said specified user, during said session considered, at least during the first connection of said first computer device to each of said second computer devices, by the activation of a control unit, especially a keyboard of said first computer device.

Said first computer device furthermore comprises first computation means, controlled by said proof software, for the dissemination, through the communications network and to the second computer device, of said ephemeral certificate and for the production of proofs that play a part in the implementation of a zero-knowledge authentication mechanism, especially of the GQ type. Said proof software program acts as a witness, as understood in the GQ authentication protocol.

Said second computer device furthermore comprises a verification software program installed on said second computer device and launching means to launch the execution of said verification software program. Said second computer device furthermore comprises second computation means, controlled by said verification software program, for opening said ephemeral certificate with a public key associated with said private signature key and for the extraction, from said ephemeral certificate, of the session identifier data Id and said public ephemeral module n and also, as the case may be, said public exponent v or said ephemeral public numbers G. Said proof software program acts as a verifier of the GQ protocol.

Preferably, in an alternative embodiment, the system according to the invention is such that said private signature key of said specified user is located in a cryptogram contained in said first computer device. In the case of this alternative embodiment, said first computer device furthermore comprises first computation means, controlled by said log-on software program, to decipher said cryptogram in implementing said personal identifiers of said specified user.

Preferably, in the case of another alternative embodiment, the system according to the invention is such that said private signature key of said specified user is located in a cryptogram contained in a memory card held by said specified user. In the case of this variant, said system furthermore comprises a memory card reader associated with said first computer device, in which said specified user inserts said memory card. Said memory card reader comprises means for the transfer of data between said memory card and said first computer device. In this case, said first computer device furthermore comprises first computation means, controlled by said log-on software program, to decipher said cryptogram in implementing said personal identifiers of said specified user.

Preferably, in the case of another alternative embodiment, the system according to the invention is such that said private signature key of said specified user is confined with signature algorithms in a memory card held by said specified user. In the case of this alternative embodiment, said system furthermore comprises a memory card reader associated with said first computer device, in which said specified user inserts said memory card. Said memory card reader comprises means for the transfer of data between said memory card and said first computer device. Said first computer device furthermore comprises first computation means, controlled by said log-on software program, to produce said ephemeral certificate in executing said signature algorithms implementing said private signature key.

First Alternative embodiment

Case of a GQ0 Type Authentication Protocol

Preferably, according to a first alternative embodiment of the invention, the system is implemented in the case of a GQ0 type authentication protocol. In this case, for the production of said public ephemeral module n, said public exponent v and at least one pair of ephemeral public numbers G and ephemeral private numbers Q, said first computation means controlled by said log-on software program, furthermore comprise means to:
set the value of said public exponent v,
randomly choose said public ephemeral modules n,
randomly choose m ephemeral private numbers $Q_1$ to $Q_m$,
compute said ephemeral public numbers G by obtaining either of the generic equations.

The ephemeral certificate relates the public ephemeral module n, the public exponent v and the ephemeral public numbers G to the session identifier data Id.

Preferably again, in the case of this first alternative embodiment, the GQ0 type authentication protocol comprises a proof mechanism implementing said public ephemeral modules n and said m ephemeral private numbers $Q_1$ to $Q_m$.

Second Alternative Embodiment

Case of a GQ1 Type Authentication Protocol

Preferably, according to a second alternative embodiment of the invention, the system is implemented in the case of a GQ1 type authentication protocol. In this case, to produce a public ephemeral module n, said public exponent v and at least one pair of ephemeral public numbers G and ephemeral private numbers Q, said first computation means controlled by said log-on software program furthermore comprise means to:
set the value of said public exponent v,
produce said ephemeral module n by multiplying at least two ephemeral prime factors such that v is prime with each ephemeral prime factor minus one,
produce the ephemeral public numbers G by the application, to a message $m_i$, of an RSA signature standard type of format mechanism, $G=Red(m_i)$,
determine a private exponent s such that $s \cdot v-1$ is a multiple of each ephemeral prime factor minus one,
produce the ephemeral private numbers $Q_i$, especially by raising the ephemeral public numbers G to the power of the private exponent s modulo n, and/or produce m×f ephemeral private components $Q_{i,j}$ of the m ephemeral private numbers $Q_i$.

The ephemeral certificate relates the public ephemeral module n and the public exponent v, to the session identifier data Id. Indeed, the messages $m_i$ do not need any special protection.

Preferably again, in the case of this second alternative embodiment, the GQ1 type authentication protocol comprises a proof mechanism implementing:
either said public ephemeral module n and said m ephemeral private numbers $Q_1$ to $Q_m$,
or the f ephemeral prime factors $p_1$ to $p_f$ of the ephemeral module $n=p_1\times\ldots\times p_f$, the m×f ephemeral private components $Q_{1,1}$ to $Q_{f,m}$ and the f−1 parameters of the ephemeral Chinese remainders.

Third Alternative Embodiment

Case of a GQ2 Type Authentication Protocol

Preferably, according to a third alternative embodiment of the invention, the system is implemented in the case of a GQ2 type authentication protocol. In this case, to produce a public ephemeral module n, a public exponent v and at least one pair of ephemeral public numbers G and ephemeral private numbers Q, said first computation means controlled by said log-on software program furthermore comprise means to:

set the value of a parameter k enabling the computation of said public exponent v of the $v=2^k$ type
produce a public ephemeral module n that is a product of f ephemeral prime factors $n=p_1\times p_2\times\ldots\times p_f$, f being greater than or equal to 2,
choose m ephemeral base numbers $g_i$, preferably small, especially smaller than 100, enabling the definition of the m ephemeral public numbers $G_i$ of the $G_i=g_i^2$ type,
produce the m ephemeral private numbers $Q_i$, especially in raising the ephemeral public numbers G to the power of the private exponent s modulo n, and/or produce m×f ephemeral private components $Q_{i,j}$ of the m ephemeral private numbers $Q_i$.

The ephemeral certificate relates the public ephemeral module n to the session identifier data Id. Indeed, the number k and the m base numbers $g_i$ do not need any special protection.

Preferably again, in the case of this third alternative embodiment, the GQ2 type authentication protocol comprises a proof mechanism implementing:
either said public ephemeral module n and said m ephemeral private numbers $Q_1$ to $Q_m$,
or the f ephemeral prime factors $p_1$ to $p_f$ of the ephemeral module $n=p_1\times\ldots\times p_f$, the m×f ephemeral private components $Q_{1,1}$ to $Q_{f,m}$ and the f−1 parameters of the ephemeral Chinese remainders.

BRIEF DESCRIPTION OF THE DRAWING

Other features and advantages of the invention shall appear from the following description of an alternative embodiment of the invention, given by way of a non-restrictive indicative examples, and from.

DETAILED DESCRIPTION OF THE PREFERRED EMBODIMENTS

Figure 1:
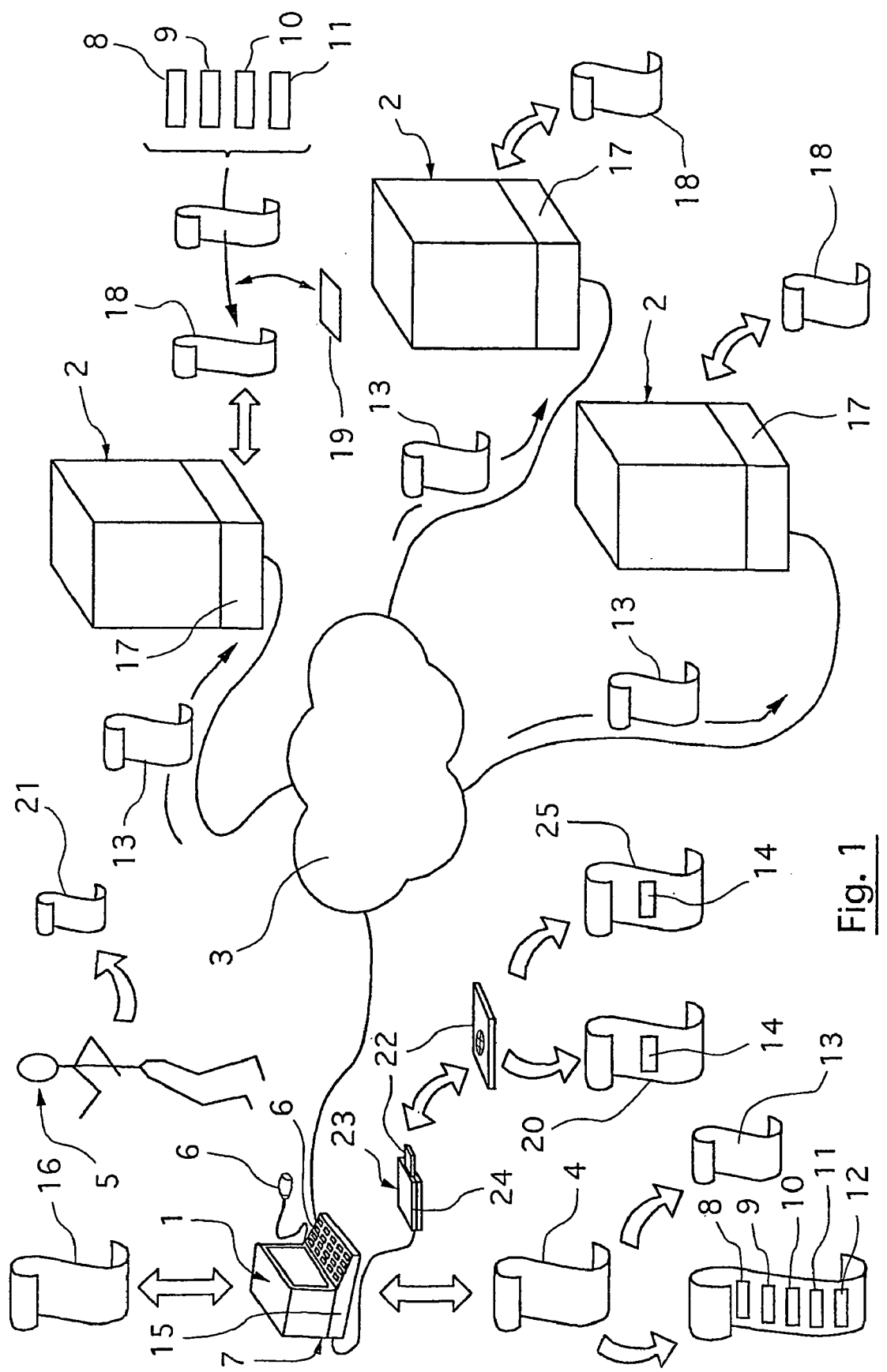
FIG. 1, which is a diagrammatic general view of the second alternative embodiment of the system according to the invention.

The invention complements the existing services and their various developments. It is a software brick that provides a novel solution to the problems of access control in virtual private networks. As is shown by the models and analyses, the workloads are reduced by two magnitudes, by a ratio of more than 100 when compared with the results obtained by presently known approaches; furthermore, the workloads balance out, namely, the load required for proof is close to the load required for verification, thus making it possible achieve mutual authentication between users in a simple away.

From the user's viewpoint, the invention can be summarized in two phases.

(1) at each log-on, the personal computer must (re)start the following:
producing an ephemeral module as well as numbers needed for the subsequent running of a GQ type zero-knowledge protocol,
producing or effecting the production of an ephemeral certificate by means of the user's private key, especially an RSA private key to relate this ephemeral module to session identification data.

(2) during the session, at each access to resources through the private network,
using an ephemeral certificate and knowledge of the decomposition of the ephemeral modules in a GQ type zero-knowledge protocol.

First of all, some explanations are needed on what is:
a session,
the problems posed by access control in a virtual private network,
the user's pair of keys and
the problem of the factorization of an arithmetic module.

These explanations are then supplemented by a taxonomy of the authentication schemes comparing the RSA and GQ zero-knowledge techniques, with an assessment of the corresponding workloads.

These introductions make it possible to then describe the invention in detail.

—Session—a session is a control exerted by a user for a limited period of time on a computer device, for example a personal computer, a personal organizer, a mobile telephone or a subscriber television decoder. A session is identified by various pieces of data:
data for the identification of the computer device and
user identifier data and
a log-on date and time and
a maximum duration planned for the session.

There is no reason why a computer device should not have several users or even available on a self-service basis; however, at a given point in time, it is under the exclusive control of a single user: on each computer device, the sessions follow one another without overlapping.

The computer device brings a session to a close for one of the following reasons:
An explicit action on the part of the user to close the session.
A detection of the absence of activity on the part of the user.
Exceeding of the maximum duration planned for the session.
Explicit action by a user to open a session.

—Problems due to access control in a virtual private network—in company networks, there is a constantly increasing number of access controls, and this raises a problem. Here are a few examples:
When a specialized server receives requests from agents for taking leave, it must identify each user, and this is generally done by a particular procedure with an individual password. Now services of this kind are greatly increasing with procedures developed on an ad hoc basis, without any great care to uniformization. The high rate of increase of such services is a real headache for the user.
Nomad users access a company network by a portal server which receives telephone calls; the identification is done according to a particular procedure with an individual password and a hardware device, for example a Secu-rId™ card giving a pseudo-random of time. This is a card developed and commercially distributed by the firm RSA Security. For obvious reasons of security, the use of such cards cannot be shared between several servers or resources. Furthermore, the use of these cards is fairly stressful for the user at the time of the telephone call.
Finally, the computer devices are protected in varying degrees by initialization procedures which also implement passwords; the best among these procedures are often those developed by the manufacturers themselves, for example the procedure used to start up Toshiba personal computers with a password. If a password is lost, a hard disk protected by this password is recovered by asking the manufacturer who has other possibilities of accessing the information carried in the hard disk.

All these access techniques are evolving and benefiting from each other.
Public key infrastructures are being set up in which each user of the private network is provided with the pair of keys: a private key and a public key. A company directory manages the public keys, with entitlements attached to each user.
Smartcards are appearing to provide for security when starting up computers. These cards can carry different procedures and the corresponding passwords. These cards are also capable of confining the user' private key and the algorithms of use of this private key.
Biometrics is being developed to identify users by techniques complementary to password techniques.

A series of observations must be made.
In a part of the services referred to here above, no distinction is made between the following:
The identification of a user, i.e. an operation testing a password and/or characteristics of the biometry of a user, hence a non-cryptographic operation, and
The cryptographic authentication of a computer device, namely an operation such that the human brain cannot record the key or execute its algorithm.
the services referred to here above are special; it is not possible to pool the passwords. They cannot be integrated into a public key infrastructure. There is need for a common service of background authentication based on public keys.
the services referred to here above are directed in the sense that the roles are determined: the personal computer sets up proof which the server verifies. In many cases, it is good that the personal computer should be capable of ensuring the authenticity of the server or resource. There is a need for a service that can achieve functions up to reciprocal authentication between personal computers located in the directory or the infrastructure of public keys, suggesting a balance of the workloads to be proven and verified.
any private key residing in the personal computer during the session is in danger of interception by a Trojan horse; the consequences of the violation of an ephemeral private key are very limited.
finally, even if the user has a chip card confining the private key and use algorithms while its public key is in an infrastructure of public keys, it is not good that, for reasons of background authentication, the user's private key should be accessible to software programs being freely executed in the personal computer. The user must have exclusive control of the use of this private key. Even when confined in the chip card, any private key freely used by the personal computer during the session is in danger of being diverted from its use beyond the user's control.

One observation needs to be made: an effective and sure public key scheme is lacking. The invention makes it possible precisely to avoid the multiplication of passwords and procedures: a unique password is attached to the user with exclusively local use. The invention proposes to complement the user's pair of keys, for example of pair of RSA keys, with an ephemeral module according to a zero-knowledge GQ technique, especially the ZK GQ2 technique. The invention complements the public key infrastructures and the implementation of smartcards confining private key and algorithm.

—User's pair of keys—in this memory, each user has a pair of keys: a public key and a private key, for example of pair of RSA keys.

The user's public key is:
- either known to the resources and servers that the user must access, with each of these computer devices possessing and managing its own directory;
- or else managed by a specialized directory, integrated into a public key infrastructure available to the resources and servers that the user must access.

The user's private key is used to compute digital signatures; it may be located:
- either in a cryptogram that is present in the personal computer or else in a down-market smartcard which communicates it to the personal computer; the computer deciphers the cryptogram by means of the user's password; having thus obtained the user's password, the personal computer then executes the signature algorithm, and then erases from its memory the private key that it has just deciphered and used,
- or else in an up-market smartcard, confined with a signature algorithm whose execution depends on the presentation of the user's password.

Problem of the factorization and size of the modules—various authentication schemes use the problem of factorization which may be stated thus: "—a public module n is the product of at least two large secret prime numbers, that is: $p_1 \leq \ldots p_f$ with $f>1$, at least two of which are distinct, giving: $p_1 < p_f$, hence: $n = p_1 \times \ldots p_f$".

The user's pair of keys must last some years; it is called a long-term key. If the user's pair of keys is of the RSA type, then it comprises a public module whose factorization must remain secret for some years. For long-term modules, reference may be made to the following results. At present, the 512-bit numbers can be factorized in less than one year, but with substantial resources. Factorization methods find factors of up to 160 bits. The size of the module must be greater than 512 bits; for example 768 bits for four years and 1024 or 1536 bits for eight years. Safety margins are necessary. Today, each long-term RSA module is the product of two factors; however, it would be easy to use three factors or even more, but this is not the practice today for RSA applications.

A pair of ephemeral keys must last some hours, at most one working day; it is called a short-term key. The invention considers a pair of ephemeral keys based on a public module whose factorization must remain secret for some hours. For the short-term modules, a 420-bit size and three 140-bit prime factors are appropriate at the present time; it is also possible to envisage a 640-bit size and 160-bit factors. The development of the size of the short-term modules is a parameter that must be adjusted in taking account of the development of the performance in factorization; this is a parameter that may change from one day to the next and that must be taken into account when designing the system.

To summarize, an ephemeral module may be to two to four times shorter than a long-term module.

A public module is always used with a public exponent. The characteristics of the public exponent depend on the scheme considered.
- the RSA schemes use an odd number as public exponent, generally a prime, especially $v=3$ and $v=2^{16}+1$.
- the ZK GQ1 schemes depend on the RSA signature, especially with $v=2^{16}+1$. What has to be done is to prove knowledge of an RSA signature without revealing it.
- the Rabin signature uses the public exponent two, that is $v=2$.
- the ZK GQ2 schemes use, as a public exponent, a power of two greater than two, that is $v=2^k$ with $k>1$. What has to be done is to prove knowledge of a decomposition of the module without revealing it.

Taxonomy of Authentication Schemes and Evaluation of Workloads

Authentication schemes bring the two entities into play. One entity produces a proof associated with the information. Another entity verifies the proof associated with the information. In a word, the verifying entity verifies that the prover is really talking about the same information. This is in order to avert risks due to an intruder threatening integrity. It is necessary to distinguish between the operation of the legitimate prover and operation of the intruder committing a forgery. Through an operation of forgery, the intruder seeks to decoy the verifier without having any a priori knowledge of all the secrets of the prover. It is clear that the prover must at least protect its private key and keep it secret.

Static authentication—in an authentication scheme without interaction, the prover forwards identification data to the verifier; the associated proof is a digital signature of these data. The verifier applies a public verification key to the digital signature. The communications interface perceives the same data and the same signature passing through at each authentication. It is then said that the authentication is static.

While a static authentication is useful locally to strengthen a visual observation of the card, it is often of no utility at a distance through an network such as the Internet. Indeed, the proof can be replayed.

Example of static authentication with RSA—The following scheme has been used in French bank cards since 1984; it is also in the international specifications published in 1996 by the credit card operators: Europay, Mastercard and Visa™ and called EMV '96. The ISO/CEI 9796 and 14888 series of standards give exemplary digital signature schemes, especially of the RSA type.

The card-issuing entity has a pair of RSA keys.
- The private signature key is the secret of the card-issuing entity. It has a private signature exponent s and a public module n.
- Each payment terminal knows the public verification key. It comprises a public verification exponent v and a public module n.

During the customization (the term used then is that of the issuing of cards), each card receives identification data and an RSA signature of this data. The RSA signature standard in use has a format mechanism Red( ) which converts the identification data, namely a string of bytes represented by Id, into a number of the ring of integers modulo n, giving J=Red(Id). The RSA signature of this data is a number S of the ring of integers modulo n; this number S is obtained by applying the private signature key to the number J; giving: $S \equiv J^s \pmod{n}$.

During each payment operation, the terminal obtains knowledge of the card identification data Id and their signature S which it verifies by means of the public verification key. The authentication succeeds or fails depending on whether or not the number Red(Id) is identical to the number $S^v \pmod{n}$.

The proof is then a point of the RSA permutation.

The verifier applies the public verification key to the signature, i.e. it raises the number S to the power v modulo n. To carry out the operation, it writes the exponent v in binary mode and examines the successive bits from the bit that follows the most significant bit up to the least significant bit. From a variable equal to S, at each bit, it raises the variable to the square modulo n, then, if the bit is equal to one, it multiplies the variable by S modulo n. When all the bits have been taken into account, the value of the variable is the result sought, namely: $S^v \pmod{n}$.

The verifier's workload therefore depends on the public verification exponent v. It must be noted that a square modulo represent about ¾ of a multiplication modulo, that is: $XM_n \approx 0.75\ MM_n$.

For v=3, which is written as 11 in binary mode, the verifier executes a square modulo n followed by a multiplication modulo n.

That is: $1\ XM_n + 1\ MM_n \approx 1.75\ MM_n$.

For $v=2^{16}+1$, which is written as 1 0000 0000 0000 0001 in binary mode, the verifier executes sixteen squares modulo n followed by a multiplication modulo n.

That is: $16\ XM_n + 1\ MM_n \approx 13\ MM_n$

Dynamic authentication—in an authentication scheme with interaction, a dialog is set up between the prover and the verifier; each entity is alternately the sender and the receiver so as to obtain a proof in real-time, namely a proof that cannot be replayed. In the following two cases, the verifier issues a challenge that taken at random, and is therefore unpredictable; we shall see that the properties of the challenge are nevertheless quite different between a doublet authentication and triplet authentication.

Dynamic doublet authentication—with two transmissions, the verifier issues a challenge produced at random; then, the prover issues a response: finally, the verifier ascertains that the response is truly appropriate to the challenge. Each challenge must be unique. This is statistically ensured if the possible challenges are fairly large in number.

To ensure that the message is known by the prover, the response must depend both in the challenge and on the message to be authenticated; the verifier must then ascertain that the response is truly appropriate to the challenge and the message.

An observation needs to be made.
 The proof may be a digital signature. However, while the constraints needed for the digital signatures are sufficient for such a protocol, the reverse is not true. Such a protocol is far less of a constraint than the digital signature, as illustrated here below in a ZK doublet authentication.

Example of dynamic authentication with RSA—each proof has two numbers forming an RSA and doublet: a number Red(challenge, message) and a number transmitted in response. The set of proofs is then a subset of the RSA permutation.

The prover computes an RSA signature that the verifier must verify.
 Without using the decomposition of the module n, and that is, without using the prime factors, the witness raises a number to the power s modulo n, that is, it executes $\log_2 n$ squares modulo n, separated every other time on an average by a multiplication modulo n.

That is: $(\log_2 n)XM_n + 0.5(\log_2 n)MM_n \approx 5/4\ \log_2 n\ MM_n$

In using the prime factors and the Chinese remainders, the witness executes:
 first of all a decomposition of a number, an element of the ring of the integers modulo n, into f components, a number in each Galois field forming the ring,
 then in each field, a signature component in $\log_2 p$ squares modulo p, separated every other time on an average by a multiplication modulo p,
 That is: $f(\log_2 p)XM_p + f/2(\log_2 p)MM_p \approx 1.25\ \log_2 n\ MM_p$
 Indeed, the factors have approximately the same size. Hence, each p is about f times shorter than n, giving: $p^f \approx n$, hence $f \log_2 p \approx \log_2 n$.

and, finally, a Chinese remainders operation to set up a signature in the ring of the integers modulo n from the f components, one in each Galois field.
 Multiplying the length of the module by f amounts to multiplying the load of the multiplication modulo by $f^2$, i.e. $MM_p \approx MM_n/f^2$. This rule enables the load to be assessed as follows.

That is: decomposition$_f + (5/4\ \log_2 n\ MM_n)/f^2 + CRT_f$

—Dynamic triplet authentication—with three transmissions, a zero-knowledge authentication is performed, that is, an authentication made without revealing anything other than the fact of knowing the secret; the prover starts by establishing a random value, then it computes and issues a commitment, then the verifier issues a challenge produced at random; then the prover sends a response as a function of the random value, the secret and a challenge; finally, the verifier re-establishes a commitment from the response and a challenge; the authentication is successful if the two commitments are identical and not zero.

Since the dialogs are independent of each other, each challenge may occur again; it must only be unpredictable; consequently, the number of possible challenges can be reduced to two.

Two observations must be made.
 With three zero-knowledge transmissions, it can be ensured that the message is known by the prover; instead of transmitting the commitment, the prover computes and transmits a hash code of the commitment and of the message to be authenticated; the verifier the re-establishes a commitment from the response and the challenge, and then a hash code of the reconstructed commitment and the message; the authentication is successful if both hash codes are identical for a non-zero reconstructed commitment. However, the triplet is always at the core of the protocol.
 The verifier takes the initiative of launching the checks, which it does in practice by issuing a "challenge commitment", which ensures that the two random draws, that of the witness which proves and that of the verifier which verifies, are effectively independent. However, the triplet is always at the core of the protocol.

Example of dynamic triplet authentication with ZK GQ1—to prove knowledge of an RSA signature using $v=2^{16}+1$, the witness computes a ZK GQ1 triplet.
 without using the decomposition of the module n, that is, without using the prime factors, the witness computes
 first of all a commitment $r^v$ (mod n) in 16 squares modulo n, then, a multiplication modulo n,
 then, a response $r \times Q_d$ (mod n) in 15 squares modulo n, on an average 8 multiplications modulo n, then, a multiplication modulo n.
 that is, in all $31\ XM_n + 10\ MM_n \approx 33.25\ MM_n$
 using the prime factors and the Chinese remainders, the witness computes
 one commitment component $r_j \times Q_j^d$ (mod $p_j$) per factor, in 16 squares modulo p and one multiplication modulo p, then, a Chinese remainders operation to establish a commitment modulo n,
 one response component $r_j \times Q_j^d$ (mod $p_j$) per factor, in 15 squares modulo p, on an average 8 multiplications modulo p and a multiplication modulo p, and then a Chinese remainders operation to establish a response modulo n.

That is, in all: $(31\ XM_n+10\ MM_n \approx 33.25\ MM_n)/f+2\ CRT_f$

The verifier reconstructs a commitment $G^d \times D^v \pmod n$ in 16 squares modulo n, on an average 8 multiplications modulo n, then a multiplication modulo n.

That is, in all: $16\ XM_n + 9\ MM_n \approx 21\ MM_n$

Each proof comprises three numbers: a commitment, a challenge and a response. The commitment and the response are two non-zero numbers R and D smaller than n. The challenge is a number d from 0 to v−1. They together form a ZK GQ1 triplet. The set of ZK GQ1 triplets constitutes the family of v permutations of the ring of integers modulo n. The zero challenge corresponds to the RSA permutation.

Example of dynamic triplet authentication with ZK GQ2—to prove knowledge of the decomposition of the module n, the witness computes a ZK GQ2 triplet.

Without using the decomposition of the module n, namely, without using the prime factors, the witness computes a commitment in k squares modulo n. It computes a response in k−2 squares modulo n, on an average (m times k−1)/2 multiplications modulo n, then a multiplication modulo n That is: $kXM_n + (k-2)XM_n + m(k-2)/2\ MM_n + MM_n \approx (m+3)(k-1)/2\ MM_n$ Using the prime factors and the Chinese remainders, the witness computes
  one commitment component per factor, in k squares modulo p, then a Chinese remainders operation to set up a commitment modulo n,
  one response component per factor k−2 squares modulo p and on an average (m times k−1)/2 multiplications modulo p, then, a multiplication modulo p, then, a Chinese remainders operation to establish a response modulo n.

That is, in all: $((m+3)(k-1)/2\ MM_n)/f+2\ CRT_f$

The verifier opens a certificate. Then it reconstructs a commitment in k squares modulo n. Indeed, the multiplications or divisions with the base numbers are negligible.

That is: $\text{Certificate} + kXM_n \approx \text{Certificate} + 0.75\ k\ MM_n$ Each proof comprises three numbers: a commitment, a challenge and a response. The commitment and the response are two non-zero numbers R and D smaller than n. The challenge d is a number consisting of m times k−1 bits. They form a ZK GQ2 triplet.

Comparison of RSA 1024 bits with ZK GQ2 420 bits—a realistic example of a pair of RSA keys uses a 1024-bit bits module with two factors. RSA is not used at present with more than two factors although there is no reason not to do so. The following are the workloads.

Producing an RSA signature represents
  1280 $MM_{1024}$ without CRT,
  324 $MM_{1024}$ with CRT (f=2)
Verifying an RSA signature represents
  1.75 $MM_{1024}$ with v=3,
  13 $MM_{1024}$ with $v=2^{16}+1$ A realistic example of a pair of ZK GQ2 keys uses a 420-bit module with three 140-bit factors with two base numbers and k=9.

Producing a triplet ZK GQ2 represents
  11.25 $MM_{420}$ with CRT, that is 1.89 $MM_{1024}$.
Verifying a triplet ZK GQ2 represents
  6.75 $MM_{420}$, that is 1.14 $MM_{1024}$.
The opening of a 1024-bit certificate represents
  0.75 $MM_{1024}$ for a square (Rabin signature),
  1.75 $MM_{1024}$ for a cube (RSA signature).

These illustrations demonstrate the gain of two magnitudes between the workload due to the implementation of a user's RSA private key and the workload due to the implementation of an ephemeral module in the ZK GQ2 technique. Such a difference in performance represents a technological break. As compared with existing systems, the consequences for the user are satisfactory ergonomy with increased security.

Other methods of zero-knowledge authentication—"He who can do more can do less." Zero-knowledge techniques enable doublet dynamic authentication and even message signatures.

Example of ZK GQ doublet dynamic authentication—the verifier issues a challenge comprising some tens of bits, for example, 32 entropy bits.

The prover then computes one or more ZK GQ triplets whose ZK challenges come from the hash code or from the commitments, the verifier's challenge and the message to be authenticated. The entropy of all the ZK challenges is greater than or equal to the entropy of the verifier's challenge, for example, 48 bits of ZK challenge for 32 bits of verifier challenge. The proof comprises the ZK GQ triplet or triplets or else an appropriate subset of these triplets,
  that is, the commitments and the responses since the challenges are easily reconstructed,
  or better still, the challenges and the responses since the commitments are easily reconstructed.

A realistic example of ZK GQ1 proof is three triplets with $v=2^{16}+1$ or better still, a single triplet with $2^{48-65}$. Another realistic example with ZK GQ2 uses a three-factor module with two base numbers: the proof comprises three triplets for k=9 and only one for k=25.

Example of ZK GQ signature—the prover then computes one or more ZK GQ triplets whose ZK challenges come from the hash code of the commitment or commitments and the message to be authenticated. The size of the ZK challenges must be large enough, for example 64 bits or 80 bits. The proof includes the ZK GQ triplet or triplets or else an appropriate subset of these triplets,
  that is, the commitments and the responses since the challenges are easily reconstructed,
  or better still, the challenges and the responses since the commitments are easily reconstructed.

A realistic example of ZK GQ1 proof is three triplets with $v=2^{16}+1$ or better still, a single triplet with $v=2^{64}-257$. Another realistic example with ZK GQ2 uses a three-factor module with two base numbers: the proof comprises three triplets for k=9 and only one for k=25.

We shall now see the details of the invention.
  at each log-on operation, the computer device executes an initialization software program with the following characteristics (the order of the operations is not significant).
    Producing identifier data for the session being initiated, this data being denoted by Id.
    Producing a public ephemeral module n, a public exponent v greater than two and at least one pair of GQ numbers, for instance m pairs with m≧1. Each pair comprises a public number G and a private number Q related by a generic equation GQ.
      Either the direct equation: $G \equiv Q^v \pmod n$
      Or the inverse equation: $G \times Q^v \equiv 1 \pmod n$
    Identifying the user by using a unique local procedure, for example the user's unique password, possibly complemented by biometrics, for example a fingerprint or voice check, to produce or cause the production of the signature under the control of the user's private key in order to relate the ephemeral module and the session identification data for the duration of the session. Such a signature is an ephemeral certificate.

Depending on the GQ method used, GQ0, GQ1 or GQ2, particular constraints apply to the production of the ephemeral module, the exponent and the public numbers, as well as the structure of the certificates.

In a first method (GQ0), a public exponent v is fixed and a public module n and m private numbers $Q_i$ are taken at random. In this case, the ephemeral private key must be represented by the module n and the m private numbers $Q_1$ to $Q_m$; the ephemeral certificate relates the session identifier data to the public numbers n, v, $G_1, \ldots G_m$.

In a second method (GQ1), the prover has to demonstrate knowledge of an RSA signature without revealing it and the verifier has to verify an RSA signature without obtaining knowledge of it. It is then necessary to use an RSA signature standard with a format mechanism converting every message to be signed into a number; such a mechanism generally uses a hash function. Every RSA verification key has the public exponent v and a public module n which is the product of two large, distinct, secret prime factors $p_1$ and $p_2$ such that v is prime with $p_1-1$ and $p_2-1$. In this case, each public number $G_i$ results from the application of the format mechanism of the signature standard to a message; that is: $G_i$=Red(message$_i$); in addition to the representation by the module n and the m private numbers $Q_1$ to $Q_m$, the ephemeral private key may again be represented advantageously by the f prime factors $p_1$ to $p_f$, m×f private components $Q_{1,1}$ to $Q_{f,m}$ and f−1 parameters of the Chinese remainders; the ephemeral certificate relates the session identification data to the two numbers n and v; indeed, message$_1$ to message$_m$ do not need any special protection.

In a third method (GQ2) the prover demonstrates knowledge of a decomposition of the module without revealing it and the verifier verifies a decomposition of the module without getting knowledge of it. The module n is a product of at least two large prime factors at least two of which are distinct, for example $f \geq 2, p_1 \leq p_2 \ldots \leq p_f$ et $p_1 < p_f$ with $n = p_1 \times p_2 \ldots \times p_f$; the public exponent v is a power of two greater than two, for example $v=2^k$ with $k \geq 2$; the $m \geq 1$ public numbers are all small squares: $G_i = g_i^2$. The numbers $g_1$ to $g_m$ are the base numbers. In this case, in addition to the module n and the m private numbers $Q_1$ to $Q_m$, the ephemeral private key may again be represented advantageously by the f prime factors $p_1$ to $p_f$, m×f private components $Q_{1,1}$ to $Q_{f,m}$ and f−1 parameters of the Chinese remainders; the ephemeral certificate relates the session to the number n; indeed the very small numbers k and $g_1$ to $g_m$ do not need any special protection.

During the session, the computer device dialogs with devices giving access to resources (for example access portals) or with devices constituting resources (for example printers or archival servers).

The computer device executes a proof software program having the following characteristics.

It does not know the user's private key.

It distributes the ephemeral certificate that makes it possible to establish Id and n for whoever knows the user's public key, said key being in the directory of public keys.

It acts in the role of ZK GQ witness to establish ZK GQ triplets constituting proofs.

Each resource executes a verification software program having the following characteristics.

It knows the user's public key or else it can procure the key for itself in a sure way. It uses it to "open" the certificate and thus establish the session identifier data and the ephemeral module plus, if necessary, an exponent and public numbers.

It acts in the role of ZK GQ to verify proofs.

It must be observed that, provided there is access to a directory to obtain knowledge of public keys, a computer device with a verification software program can absolutely authenticate a session logged on to by any user in the directory.

Referring to FIG. 1, the system according to the invention enables a personal computer 1 to be authenticated by one or more servers 2. In a manner known per se, the user 5 connects his personal computer 1 to the servers 2 through a communications network 3.

The Log-On Phase

A description shall now be given of the phase in which a user 5 having authorized access logs on to the personal computer 1. The session is planned for a limited duration of about one day. The personal computer 1 has a log-on software program 4. This log-on software program 4 has been installed in the personal computer 1, prior to the logging on by the user 5 or by any person entitled to do so. The user 5 launches the execution of the log-on software program 4 by activating a key of the keyboard 6 or by using a mouse to click on an icon corresponding to the log-on software program 4. The user 5 introduces personal identifiers 21, especially a password, into the personal computer 1, by means of the keyboard 6. The use of a password may be complemented by a fingerprint. In a manner known per se, the personal identifiers 21 enable the log-on software program 4 to verify the identity of the specified user 5 and access the private signature key 14 of the specified user. In the case of the alternative embodiment described, which does not refer to FIG. 1, the private signature key 14 of the user 5 is located in a cryptogram 20 containing in a memory card 22 belonging to the specified user 5. A reader 23 of a memory card 22 is connected to the personal computer 1. At the beginning of the session, the user 5 inserts his memory card 22 into the reader 23. The reader 23 has data transfer means 24 for the transfer of data between said memory card 22 and the first computation means 7 of the personal computer 1. Under the control of the log-on software program 4, the first computation means 7 decipher said cryptogram 20 by implementing the personal identifiers 21 of the specified user 5 in a manner known per se.

In another alternative embodiment, the private signature key 14 of the user 5 is located in a cryptogram 20 contained in a memory zone of the personal computer 1. In the case of an alternative embodiment of this kind, the first computation means 7, controlled by the log-on software program 4, decipher said cryptogram 20 by implementing the personal identifiers 21 of the user 5.

In another alternative embodiment, the private signature key 14 of the user 5 is confined with the signature algorithms 25 in a microprocessor card 22 held by the specified user 5. In the case of an alternative embodiment of this kind, the user insert his microprocessor card 22 into a reader 23 of a microprocessor card 22, connected to the personal computer 1. The reader 23 has data transfer means 24 for the transfer of data between the microprocessor card 22 and the personal computer 1. The first computation means 7 of the personal computer 1, controlled by said log-on software program 4, produce the ephemeral certificate 13 which shall be described here below by implementing said private signature key 14 and executing the signature algorithms 25.

The description of the log-on phase shall now be continued. The first computation means 7 of the personal computer 1, controlled by said log-on software means 4, produce session identifier data Id 8 from the user identifier data 5, the personal computer identifier data 1, the date the time and the duration of the session. The first computation means 7 also produce a public ephemeral module n 9, a public exponent v 10 and at least one pair of ephemeral public numbers G 11 and ephemeral private numbers Q 12. The parameters n, v, G and Q are related by generic equations of the type:

$$G \equiv Q^v \pmod{n}$$

or of the type $$G \times Q^v \equiv 1 \pmod{n}.$$

The first computation means 7 also produce a unique ephemeral certificate 13 in signing the session identifier data Id 8 and said public ephemeral module n 9 by means of said private signature key 14 of the user 5. If necessary, the certificate may also comprise the signature of said public exponent v 10 or the signatures of the ephemeral public numbers G 11. It must be made clear here that the term "unique certificate" refers to the fact that, in practice, the log-on software program 4 will produce no other certificates during a session identified by: the identifier data of the user 5, the identifier data of the personal computer 1, the date and time of logging on as well as the maximum duration planned for the session. However, it is not ruled out that, during the same session, the user may use his private signature key to carry out signature operations. For the purpose of preventing the issuance of another certificate during the session considered, the personal computer 1 has disabling means 15 to disable the execution of the log-on software program 4, after the log-on phase, throughout the session.

During the Session

A description shall now be given of the authentication operations during a session. At least during the first connection of the personal computer 1 to one of the servers 2, the user 5 launches the execution of a proof software program 16, installed in the personal computer 1. This proof software program 16 will have been installed in the personal computer 1, prior to the logging-on operation, performed by the user 5 or by any person entitled to do so. The user 5 launches the execution of the proof software program 16 by activating the key of the keyboard 6, or by clicking on the proof software program 16 icon with the mouse of his personal computer. The first computation means 7, controlled by said proof software program 16, send said ephemeral certificate 13 through the communications network 3 to the server 2. The first computation means 7, controlled by said proof software program 16, produce proofs in a manner known per se according to the GQ technology. These proofs are intended for use in the implementation of a zero-knowledge GQ type authentication mechanism. The proof software program 16 acts as a witness according to the GQ protocol.

A verification software program 18 is installed on the server 2. This server has launching means that are activated, in a manner known per se, during the setting up of a computer link with the personal computer. These launching means launch the execution of said verification software program 18.

Under the control of the verification software program 18, the second computation means 17, open the ephemeral certificate 13, with a public key 19 associated with said private signature key 14. Under the control of the verification software program 18, the second computation means 17 extract, from the ephemeral certificate 13, the session identifier data Id 8 and said ephemeral module n 9 along with, as the case may be, said public exponent v 10 and said ephemeral public numbers G 11. The proof software 16 acts as a verifier according to the GQ protocol.

A description shall now be given more particularly of a first alternative embodiment of the system when the authentication protocol is of the GQ0 type. In the case of this alternative embodiment, the first computation means 7, under the control of the log-on software program 4, produce a public ephemeral module n 9, a public exponent v 10 and at least one pair of ephemeral public numbers G 11, and ephemeral private numbers Q 12 in the manner described here below. The first computation means 7 furthermore comprise means to set the value of said public exponent v 10, randomly choose said public ephemeral module n 9, randomly choose said ephemeral private numbers Q 12, compute said ephemeral public numbers G 11 by applying either of the generic equations. In the case of this alternative embodiment, the ephemeral certificate 13 relates the public ephemeral module n 9, the public exponent v 10 and the ephemeral public numbers G 11 to the session identifier data Id. In the case of this alternative embodiment, the GQ0 type authentication protocol comprises a proof mechanism implementing said public ephemeral module n 9 and said m ephemeral private numbers $Q\,12_1$ to $Q_m$.

A description shall now be given more particularly of a second alternative embodiment of the system when the authentication protocol is of the GQ1 type. In the case of this alternative embodiment, the first computation means 7, controlled by said log-on software program 4, produce a public ephemeral module n 9, a public exponent v 10 and at least one pair of ephemeral public numbers G 11, and ephemeral private numbers Q 12 in the manner described here below. The first computation means 7 comprise means to set the value of said public exponent v 10, produce said ephemeral module n 9 in multiplying at least two ephemeral prime factors such that v is prime with each ephemeral prime factor minus one, produce the ephemeral public numbers G 11 in applying, to a message $m_i$, an RSA type signature standard format mechanism, $G = \text{Red}(m_i)$, determine a private exponent s such that $s \cdot v - 1$ is a multiple of each ephemeral prime factor minus one, produce the ephemeral private numbers $Q_i$ 12, especially in raising the ephemeral public numbers G 11 to the power of the private exponent s modulo n, and/or produce m×f ephemeral private components $Q_{i,j}$ of the m ephemeral private numbers $Q_i$ 12. It can therefore be seen that this third alternative embodiment does not necessarily use the ephemeral private numbers $Q_i$ 12 directly but uses the ephemeral private components $Q_{i,j}$ 12. The ephemeral certificate 13 relates the public ephemeral module n 9 and the public exponent v 10 to the session identification data Id. Indeed, in the case of this variant, the messages $m_i$ do not need any special protection. In the case of this alternative embodiment, the GQ1 type authentication protocol comprises a proof mechanism implementing either said public ephemeral module n 9 and said m ephemeral private numbers $Q_1$ to $Q_m$ 12 or the f ephemeral prime factors $p_1$ to $p_f$ 26 of the ephemeral module $n = p_1 \times \ldots \times p_f$, the m×f ephemeral private components $Q_{1,1}$ to $Q_{f,m}$ 27 and the f−1 parameters of the ephemeral Chinese remainders 28.

A description shall now be given more particularly of a third alternative embodiment of the system when the authentication protocol is of the GQ2 type. In the case of this alternative embodiment, the first computation means 7, controlled by said log-on software program 4, produce a public ephemeral module n 9, a public exponent v 10 and at least one pair of ephemeral public numbers G 11, and ephemeral private numbers Q 12 in the manner that shall be described here below. The first computation means 7 comprise means to set the value of a parameter k by which it is possible to compute said public exponent v 10 of the $v=2^k$ type, produce a public ephemeral module n 9 that is the product of f ephemeral prime factors $n=p_1 \times p_2 \times \ldots \times p_f$, f being greater than or equal to 2, choosing m ephemeral base numbers $g_i$, that are small, in particular smaller than 100, enabling the definition of the m ephemeral public numbers $G_i$ 11 of the $G_i = g_i^2$ type, produce the m ephemeral private numbers $Q_i$ 12, especially in raising the ephemeral public numbers G 11 to the power of the private exponent s modulo n, and/or produce m×f ephemeral private components $Q_{i,j}$ 12 of the ephemeral private numbers $Q_i$ 12. It can therefore be seen that this third alternative embodiment does not necessarily use the ephemeral public numbers $G_i$11 directly but use the ephemeral base numbers $g_i$. Similarly, it does not necessarily use the ephemeral private numbers $Q_i$12 directly but use the ephemeral private components $Q_{i,j}$12. In the case of this alternative embodiment, the ephemeral certificate 13 relates the public ephemeral module n 9 to the session identification data Id. Indeed, the number k and the m base numbers $g_i$ do not need any special protection. In the case of this alternative embodiment, the GQ2 type authentication protocol comprises a proof mechanism implementing either said public ephemeral module n 9 and said m ephemeral private numbers $Q_1$ to $Q_m$ 12 or the f ephemeral prime factors $p_1$ to $p_f$ 26 of the ephemeral module $n=p_1 \times \ldots \times p_f$, the m×f ephemeral private components $Q_{1,1}$ to $Q_{f,m}$ 27 and the f−1 parameters of the ephemeral Chinese remainders 28.

The implementation of small-sized ephemeral public numbers G 11 and ephemeral private numbers Q 12 in GQ type authentication protocols using the Chinese remainders method associated with RSA type log-on protocols makes it possible to resolve the problem posed and achieve the goals aimed at by the present invention. Indeed, the combination of the technical characteristics described here above enables a reduction of workloads and, correlatively, of the waiting times of the users during each phase of authentication of their personal computers by the servers that they wish to access. It can be seen that the reduction of the workload is in a ratio of one to hundred as compared with what it would be if the method were to implement known protocols, especially of the RSA type. This reduction of the workloads obtained by the implementation of small-sized ephemeral public numbers G 11 and ephemeral private numbers during short sessions does not reduce the security of the authentication method since:

firstly, the GQ protocols provide greater security than the RSA protocols for comparable circumventing capacity, secondly, the RSA-type large-sized, long-duration private signature key used to generate the ephemeral certificates are not accessible during the sessions, finally, the ephemeral character of the small-sized public numbers G and private numbers does not allow fraudulent individuals the time needed to retrieve confidential data of the GQ authentication protocols.

The method according to the invention can be used to identify the user using the personal computer concerned during a session and authenticate this personal computer from several servers, without its being necessary for the user to memorize several passwords, and without its being necessary for the users and for the managers of servers to have substantial computation resources available on their personal computers or their servers.

The method of the invention is therefore open to a large number of applications.

The invention claimed is:

1. A method for allowing a first computer device to be authenticated by at least one second computer device during a communication session of limited duration between the first computer device and the at least one second computer device, the method comprising:

a step, for a user, of logging on said first computer device by executing a log-on software program and by introducing personal identifiers, said personal identifiers enabling the checking of the identity of said user and the accessing of a private signature key of said user;

a step, for said log-on software program, of producing:

a session identifier data Id, a set of one or more private numbers $Q_1, Q_2, \ldots, Q_m$ and respective public numbers $G_1, G_2, \ldots, G_m$, each pair of numbers $(Q_i, G_i)$ verifying either the equation $G_i \cdot Q_i^v \equiv 1$ mod n or the equation $G_i \equiv Q_i^v$ mod n, wherein m is an integer greater than or equal to 1, i is an integer between 1 and m, and wherein v is a public exponent, and wherein n is a public module equal to the product of f private prime factors designated by $p_1, \ldots, p_f$, at least two of these prime factors being different from each other, wherein f is an integer greater than 1, said public module n being small relative to the private signature key and such that said public module n cannot be factorized by a computer having state-of-the-art computing power in a time as short as the duration of said session, and a certificate, by signing with said private signature key at least said session identifier data Id and said public module n;

disabling the execution of the log-on software program after the log-on process is completed;

the method further comprising, at least during the first connection of said first computer device to each of said at least one second computer devices:

a step, for said user, of starting execution of a proof software program acting as a witness in a zero-knowledge authentication protocol; sending said certificate to the at least one second computer device;

a step, for said at least one second computer device, of starting execution of a verification software program acting as a verifier in said zero-knowledge authentication protocol;

a step, for said verification software program, of opening said certificate with a public key associated with said private signature key, and of extracting from this certificate the session identifier data Id and the public module n; and a step, for the proof software program and for the verification software program of completing said zero-knowledge authentication protocol.

2. The method according to claim 1, wherein said first computer device contains a cryptogram of said private signature key, the method further comprising a step, for said log-on software program, of deciphering said cryptogram by using said personal identifiers.

3. The method according to claim 1, wherein a cryptogram of said private signature key is contained in a memory card held by said user, the method further comprising:

a step, for said user, of inserting said memory card in a memory card reader associated with said first computer device; and a step, for said log-on software program, of deciphering said cryptogram by using said personal identifiers.

4. The method according to claim 1, wherein said private signature key is located together with signature algorithms in a memory card held by said user, the method further comprising:
- a step, for said user, of inserting said memory card in a memory card reader associated with said first computer device; and
- a step, for said log-on software program, of producing said certificate by executing said signature algorithms with said private signature key.

5. The method according to claim 1, wherein said zero-knowledge authentication protocol is of the Guollou-Quisquater Zero (GQ0) type.

6. The method according to claim 1, wherein said zero-knowledge authentication protocol is of the Guollou-Quisquater One (GQ1) type authentication protocol, and wherein said public exponent v is prime with all numbers $(p_j-1)$, where the numbers $p_j$, for $j=1, \ldots, f$, are the prime factors of the public module n, and wherein each public number $G_i$, where $i=1, \ldots, m$, is obtained by applying an Rivest-Shamir-Adleman (RSA) standard signature format Red to a respective message $m_i$, and wherein the private numbers $Q_i$, where $i=1, \ldots, m$, are such that $Q_i \equiv G_i^s \mod n$, where s is a private exponent such that $(sv-1)$ is a multiple of all numbers $(p_j-1)$ for $j=1, \ldots, f$.

7. The method according to claim 1, wherein said zero-knowledge authentication protocol is of the Guollou-Quisquater Two (GQ2) type authentication protocol, and wherein $v=2^k$, where k is a security parameter having an integer value greater than 1, and wherein each public number $G_i$ (for $i=1, \ldots, m$) is such that $G_i \equiv g_i^2 \mod n$, where $g_i$ (for $i=1, \ldots, m$) is a base number having an integer value greater than 1, and wherein the private numbers $Q_i$, where $i=1, \ldots, m$, are such that $Q_i \equiv G_i \mod n$, where s is a private exponent such that $(sv-1)$ is a multiple of all numbers $(p_j-1)$, where the numbers $p_j$ for $j=1, \ldots, f$, are the prime factors of public module n.

8. The method according to claim 1, wherein the step of extracting further comprises:
- extracting from this certificate at least one element of the group comprising said public exponent v and said public numbers $G_1, G_2, \ldots, G_m$.

9. A system comprising a first computer device and at least one second computer device, said computer devices being connected to a communications network, said system allowing the first computer device to be authenticated by the at least one second computer device during a communication session of limited duration between the first computer device and the at least one second computer device,
the first computer device comprising:
- a memory on which is recorded a log-on software program to be executed by a user when logging on said first computer device by activating a control unit and by introducing personal identifiers through said control unit, said personal identifiers enabling the checking of the identity of said user and the accessing of a private signature key of said user;
- first computation means, controlled by said log-on software, having means for producing:
  - a session identifier data Id,
  - a set of one or more private numbers $Q_1, Q_2, \ldots, Q_m$ and respective public numbers $G_1, G_2, \ldots, G_m$, each pair of numbers $(Q_i, G_i)$ verifying either the equation $G_i \cdot Q_i \equiv 1 \mod n$ or the equation $G_i \equiv Q_i^v \mod n$, wherein m is an integer greater than or equal to 1, i is an integer between 1 and m, and wherein v is a public exponent, and wherein n is a public module equal to the product of f private prime factors designated by $p_1, \ldots, p_f$, at least two of these prime factors being different from each other, wherein f is an integer greater than 1, said public module n being small relative to the private signature key and such that said public module n cannot be factorized by a computer having state-of-the-art computing power in a time as short as the duration of said session, and
  - a certificate, by signing with said private signature key, at least said session identifier data Id and said public module n;
- disabling means having means for disabling the execution of the log-on software program after the log-on process is completed;
- a memory on which is recorded a proof software program having instructions for controlling said first computation means, and for acting, when executed by said user at least during the first connection of said first computer device to each of said at least one second computer device by activating said control unit, as a witness in a zero-knowledge authentication protocol;

means for sending said certificate to the at least one second computer device; and the at least one second computer device comprising:
- a memory on which is recorded a verification software program having instructions for controlling second computation means, for opening said certificate with a public key associated with said private signature key, and for extracting from said certificate the session identifier data Id and the public module n, in order to act as a verifier in said zero-knowledge authentication protocol; and
- launching means for launching the execution of said verification software program.

10. The system according to claim 9, wherein:
- said first computer device further comprises a cryptogram of said private signature key; and
- said log-on software program has instructions for deciphering said cryptogram by using said personal identifiers.

11. The system according to claim 9, further comprising:
- a memory card held by said user and containing a cryptogram of said private signature key; and
- a memory card reader associated with said first computer device for reading said memory card; and
- wherein said log-on software program has instructions for deciphering said cryptogram by using said personal identifiers.

12. The system according to claim 9, further comprising:
- a memory card held by said user and containing said private signature key together with signature algorithms; and
- a memory card reader associated with said first computer device for reading said memory card; and
- wherein said log-on software program has instructions for producing said certificate by executing said signature algorithms with said private signature key.

* * * * *